United States Patent [19]

Brovelli

[11] Patent Number: 5,374,213

[45] Date of Patent: Dec. 20, 1994

[54] CHASSIS AND DRIVE TRAIN FOR TOY VEHICLES

[75] Inventor: Virginio Brovelli, Taino, Italy

[73] Assignee: Lanard Toys Limited, Kowloon, Hong Kong

[21] Appl. No.: 128,356

[22] Filed: Sep. 28, 1993

[51] Int. Cl.$^5$ .................. A63H 29/22; A63H 17/267; B60K 17/34

[52] U.S. Cl. .................. 446/463; 180/233; 180/65.6; 446/443; 446/448; 446/470

[58] Field of Search .......... 446/443, 448, 461–463, 446/470, 95, 457, 449; 180/233, 65.1, 65.6, 65.7

[56] References Cited

U.S. PATENT DOCUMENTS

| Re.19,987 | 5/1936 | Wells et al. | 180/233 |
|---|---|---|---|
| 464,246 | 12/1891 | Dewey | 180/65.6 X |
| 4,467,557 | 8/1984 | Kuna et al. | 446/463 |
| 4,878,877 | 11/1989 | Auer et al. | 446/443 X |
| 4,938,306 | 7/1990 | Sumiyoshi et al. | 180/233 |

Primary Examiner—Danton D. DeMille
Attorney, Agent, or Firm—Brumbaugh, Graves, Donohue & Raymond

[57] ABSTRACT

A chassis and drive train for toy vehicles comprises a housing, front and rear axles mounted on the housing for rotation, a drive motor, and an output power transmission coupled between the motor and the first axle for driving the first axle. A coupling transmission connected between the first and second axles for transmitting the rotation of the first axle to the second axle includes a first transmission train driven by the first axle, an idler mounted on the housing and driven by the first transmission train, and a second transmission train driven by the idler and driving the second axle. The transmission trains of the coupling transmission include drive shafts that intersect at an angle of substantially less than 180 degrees. With this geometry, the bottom of the chassis housing can be located well above the base plane defined by the axles, inasmuch as the drive shafts that couple the axles are oblique to each other and the idler is located well above the base plane. An advantageous arrangement of the batteries is included. The motor output transmission is arranged to disengage automatically in response to a resisting torque greater than a predetermined value.

10 Claims, 5 Drawing Sheets

CHASSIS AND DRIVE TRAIN FOR TOY VEHICLES

BACKGROUND OF THE INVENTION

The popularity of the 4×4 big wheel pick-up trucks, such as those often seen at fairs and competitions, has driven strong sales of motorized toy replicas for several years. The motorized toy monster 4×4 trucks conventionally provide four-wheel drive capability by driving one axle and coupling the driven axle to the other axle by a straight drive shaft, i.e., a drive shaft that runs substantially in the plane defined by the two axles. Accordingly, the underside of the chassis of the toy is no higher at any point between the two wheels than the plane of the wheel axles, and the toy can bottom out and stop when going over some kinds of terrain. The low chassis also is aesthetically undesirable, inasmuch as it does not look like a real-life monster truck, in which the bottom of the chassis is well above the plane of the axles.

SUMMARY OF THE INVENTION

An object of the present invention is to provide a chassis and a four-wheel drive train for toy vehicles in which the bottom of the chassis between the wheels is located a substantial distance above the plane of the axles. Another object is to improve the geometry of the chassis, including the location of the drive motor and a battery housing. Still another object is to provide for automatic disengagement of the drive train if the reaction torque transmitted from the driven axle to the motor output transmission exceeds a predetermined value.

The foregoing objects are attained, in accordance with the present invention, by a chassis and drive train for toy vehicles comprising a housing, first and second axles mounted on the housing for rotation, a drive motor, and an output power transmission coupled between the motor and the first axle for driving the first axle. A coupling transmission connected between the first and second axles for transmitting the rotation of the first axle to the second axle includes a first transmission train driven by the first axle, an idler mounted on the housing and driven by the first transmission train, and a second transmission train driven by the idler and driving the second axle.

In a preferred embodiment, the first transmission train includes an input gear, such as a crown gear, on the first axle and a drive shaft having a driven gear, such as a pinion, coupled to the input gear and a driving gear, which may also be a pinion, coupled to an idler gear, such as a crown gear. The second transmission train includes a drive shaft, a driven gear on the drive shaft coupled to the idler gear, and a driving gear on the drive shaft that is coupled to an output gear on the second axle. The axes of the drive shafts of the coupling transmission, preferably, intersect at an angle of substantially less than 180 degrees. In particular, the axles are parallel and define a base plane, and the idler is located a substantial distance from the base plane and intermediate of planes that include the respective axles and are perpendicular to the base plane. With this geometry, the bottom of the chassis housing can be located well above the base plane defined by the axles, inasmuch as the drive shafts that couple the axles are oblique to each other and the idler gear is located above the base plane.

Another aspect of a preferred embodiment is the arrangement of the drive motor and the output power transmission as a drive unit that is pivotally mounted on the housing. The output power transmission includes a pair of output gears arranged to mesh selectively with a driven gear on the first axle upon pivoting of the drive unit, thereby to provide forward and reverse driving of the first axle. The gear on the motor shaft may be a worm gear that simultaneously drives a pair of compound output gears, each having a first circumferential row of teeth driven by the worm gear and a second circumferential row of teeth arranged to mesh selectively with a driven gear on the first axle upon pivoting of the drive unit, thereby to provide forward and reverse driving of the first axle at selected drive positions of the drive unit. Detents acting between the drive unit and the housing establish and maintain releasable, selected forward and reverse drive positions and a non-driving position of the drive unit. The detents are arranged to release the drive unit from the respective drive positions upon application of a predetermined reaction torque imposed by the driven gear of the first axle on the respective output gears of the output power transmission.

The drive unit is, advantageously, mounted on one side of the base plane and proximate to a plane perpendicular to the base plane and including the first axle. When the drive motor is a battery-powered motor, the batteries may be received in a battery-holder affixed in the housing intermediate of respective planes perpendicular to the base plane and including the axles. It is desirable that the battery-holder receive the batteries with their axes substantially perpendicular to the base plane, which makes it easy to install them.

For a better understanding of the invention, reference may be made to the following description of an exemplary embodiment, taken in conjunction with the accompanying drawings.

DESCRIPTION OF THE EMBODIMENT

Figure 1:
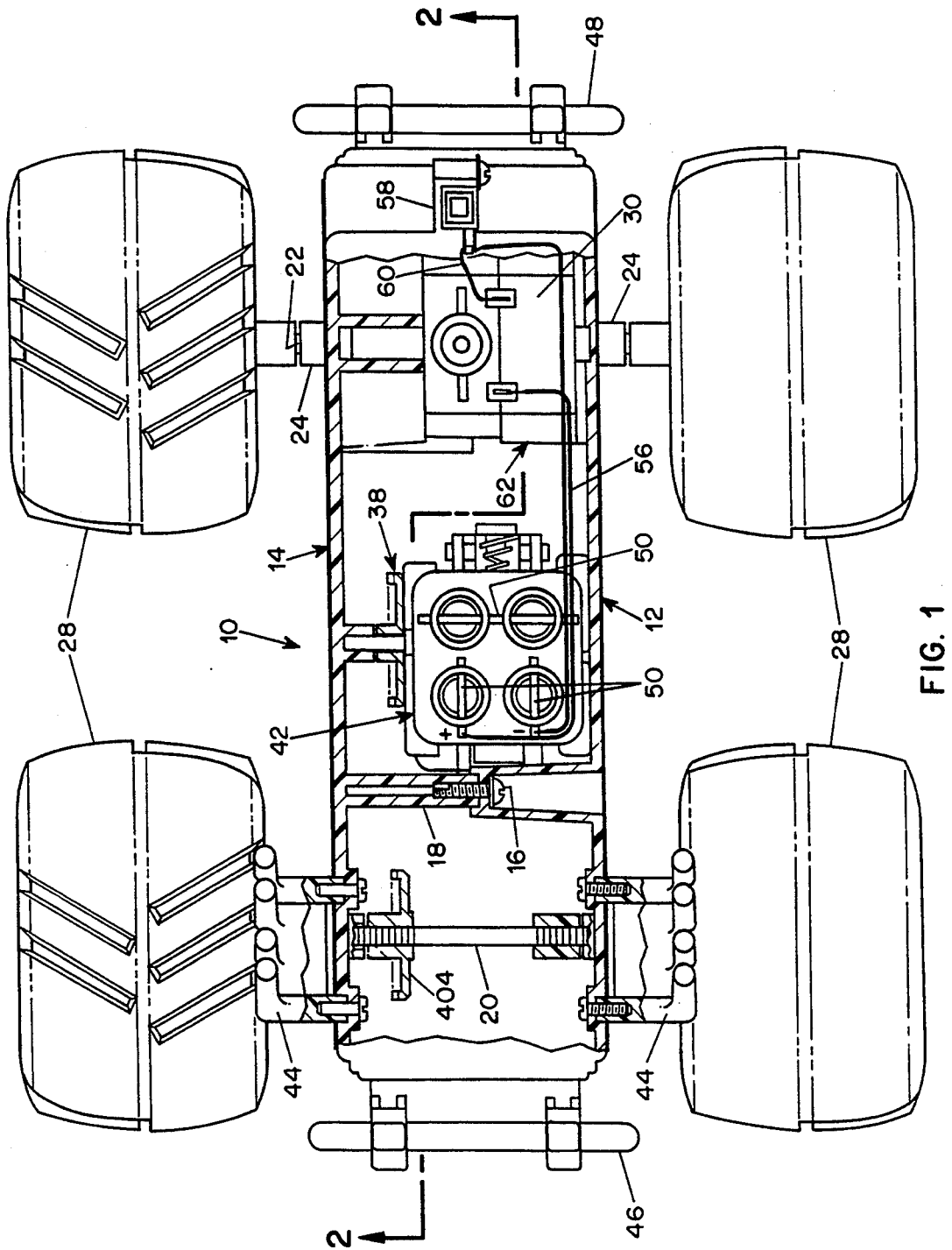
FIG. 1 is a top plan view of the embodiment in which most of the upper part of the housing has been broken away.
Figure 2:
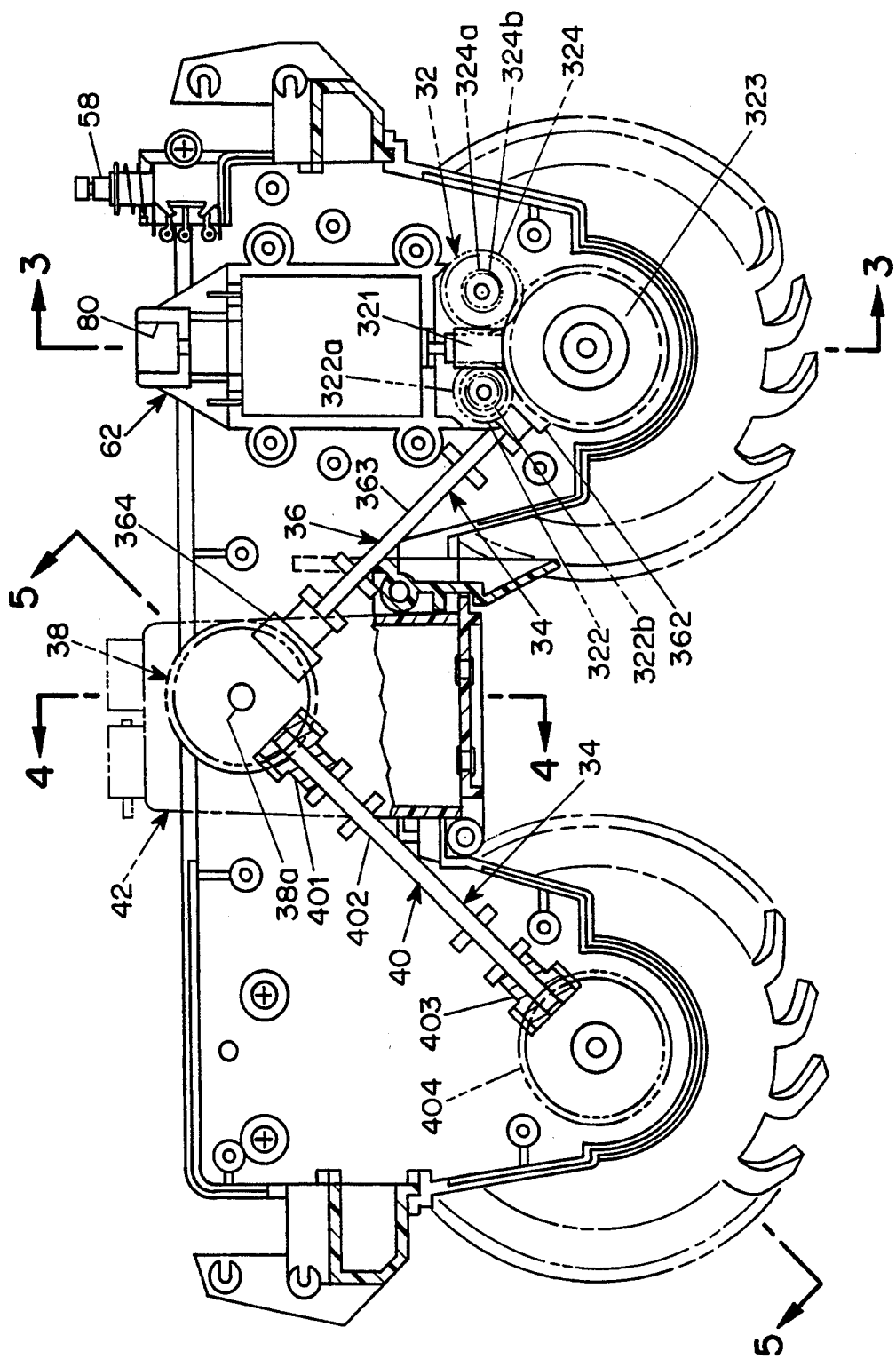
FIG. 2 is a side cross-sectional view of the embodiment, taken generally along the line 2-2 of FIG. 1, but with some portions broken away or added.

A housing 10 is composed of two molded plastic parts 12 and 14 that meet edge-to-edge at a lengthwise vertical plane and are joined by screws (e.g., 16) that pass through one part 12 and are received in screw bosses 18 in the other part 14. A front axle 20 and a rear axle 22 are rotatably supported in annular bosses 24 on the housing parts and have hubs 26 and tires 28 affixed to them on end portions that extend outwardly from both sides of the housing 10. The housing is configured to define a closed compartment for, as best seen in FIG. 2, a drive motor 30, an output power transmission 32 coupled between the motor and the rear axle 22 for driving the rear axle, and a coupling transmission 34 connected between the front and rear axles for transmitting the rotation of the rear axle to the front axle. The coupling transmission 34 includes a first transmission train 36 driven by the rear axle, an idler 38 mounted on the housing and driven by the first transmission train 36, and a second transmission train 40 driven by the idler and driving the front axle. In the embodiment, the motor 30 is an electric motor, and the housing 10 receives a battery compartment 42, which is located in the center portion of the housing, the bottom of which is raised above the plane of the wheel axles 20 and 22 to provide an increased clearance from the plane of the lowermost parts of the wheels. The housing supports various components that are essentially decorative in nature, such as exhaust pipes 44 on each side near the front, front and rear bumper and winch supports 46 and 48, and a body, which is not shown and can take various forms.

The battery compartment 42 receives four "AA" batteries in a vertical orientation. The positive and negative poles are connected in series by buss bars 50 at the top of the compartment. The bottom of the compartment 42 has an access opening for receiving the batteries that is normally closed by a cover 52. The cover is hinged to the compartment body and is held closed by a latch lever 54. The arrangement of the battery compartment facilitates replacing the batteries; the toy is inverted, the cover 52 is opened, the batteries are simply dropped into place in the proper orientations (plus or minus pole down), and the cover is closed and latched. One of a pair of wires 56 attached to the battery set runs from one of the buss bars 50 to a push button switch 58 attached to the top of the housing. A wire 60 connects the switch to one of the motor poles. The other wire of the pair 56 connects the other motor pole to another buss bar 50.

The motor 30 is mounted in a two-part case 62 (see FIG. 3) that is, in turn, pivotally supported in the housing 10 by reception of shafts 64 and 66 on the case in sockets 68 and 70 on the insides of the housing parts 12 and 14. The axis of rotation of the motor case 62 is parallel to the rear axle and is located to provide for different engagements of the motor output transmission 32 in three different pivoted positions of the case about the pivot axis, as described below. Each position of the case 62 is releasably established and maintained by a spring-loaded detent 72 that is supported in a socket 74 on the housing part 14. In any given position of the motor case, the detent 72 engages one of three tapered recesses (e.g. 76) in the side wall of the motor case, each such recess corresponding to one of the three positions of the case.

Figure 3:
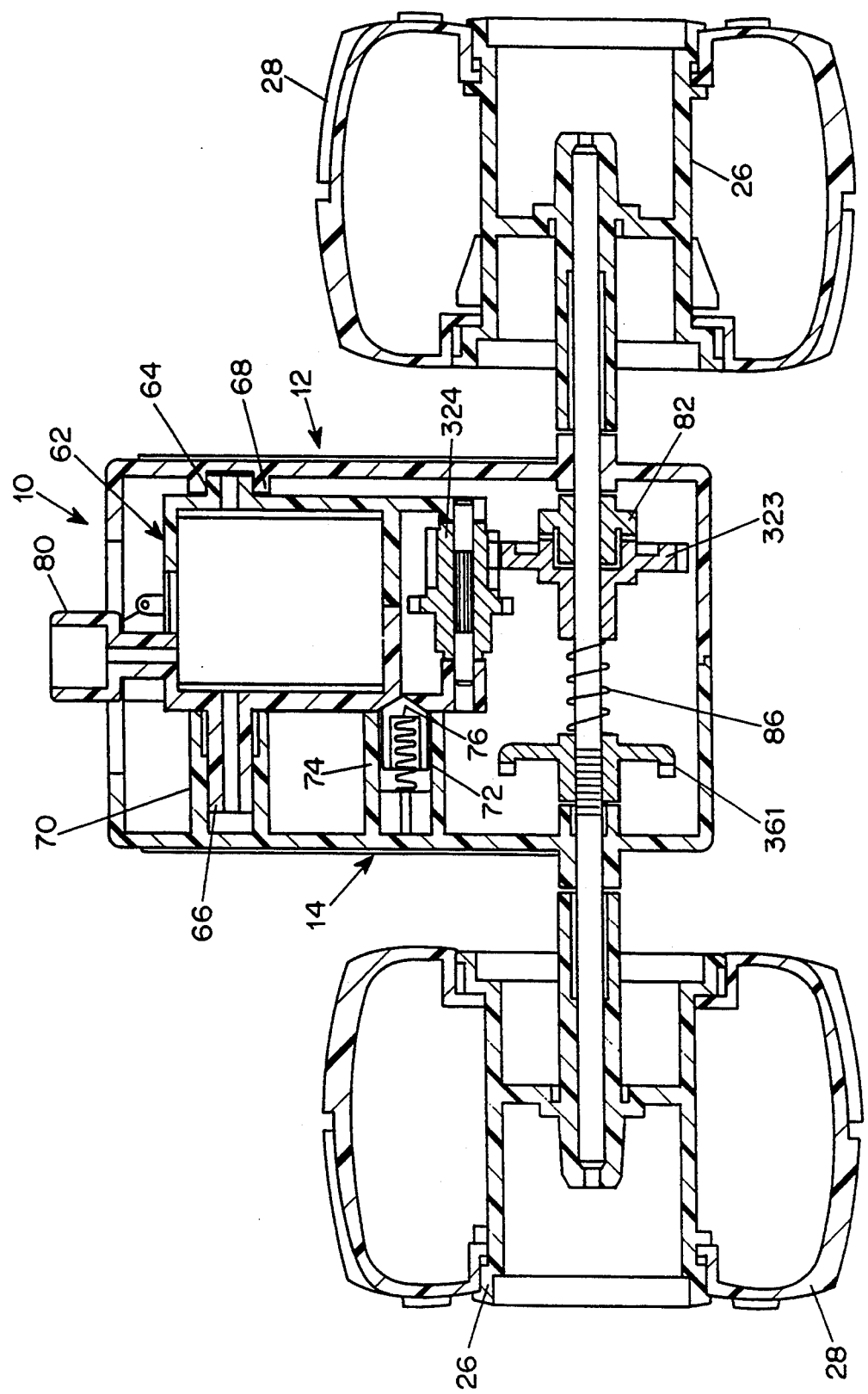
FIG. 3 is an and cross-sectional view of the embodiment, taken generally along a broken plane indicated by the line 3-3 of FIG. 2.
Figure 4:
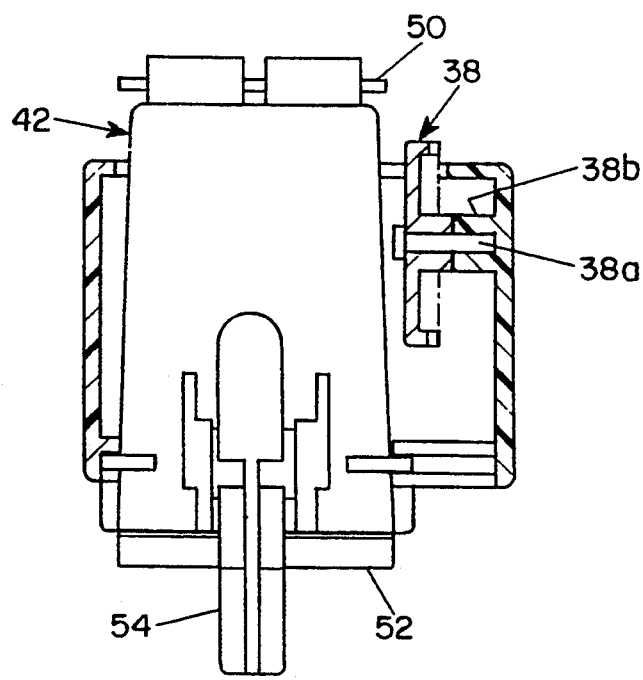
FIG. 4 is a fragmentary cross-sectional view, taken along the lines 4-4 of FIG. 2.
Figure 8:
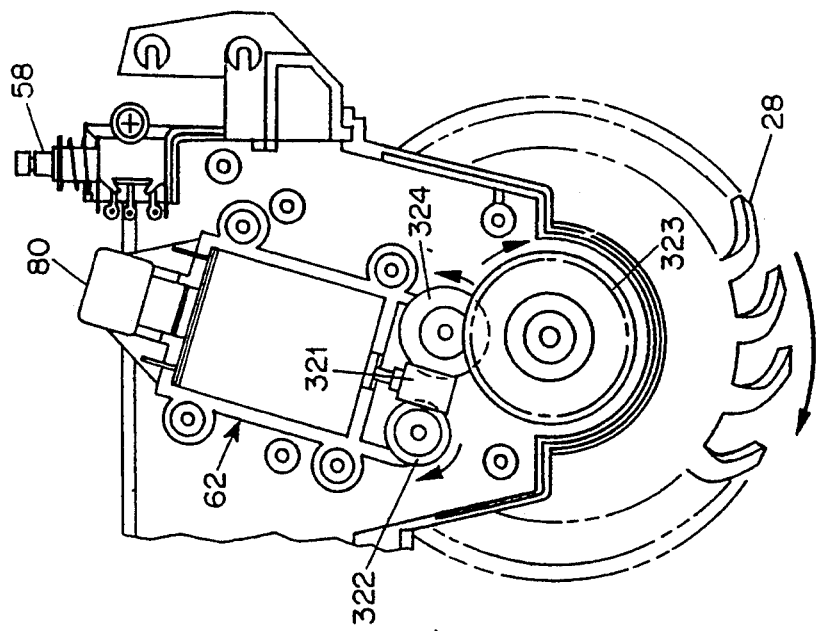
FIGS. 6, 7 and 8 are partial side cross-sectional views, illustrating the positions of the motor output transmission in the forward driving, neutral and reverse driving conditions, respectively.
Figure 6:
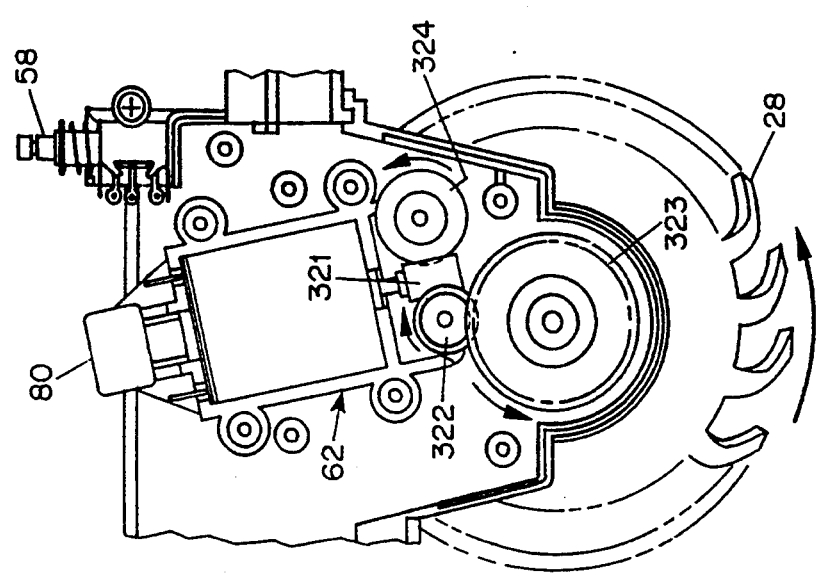

Referring to FIGS. 2 and 3, the motor output transmission 32 comprises a worm gear 321 affixed to the motor shaft, a forward-driving compound idler pinion 322 rotatably supported in the case 62 and having a row of driven external teeth 322a that mesh with the worm gear and a row of driving external teeth 322b that selectively mesh with and drive a driven gear 323 carried by the rear axle 22, and a rearward-driving compound idler pinion 324 rotatably supported in the case 62 and having a row of driven external teeth 324a that mesh with the worm gear and a row of driving external teeth 324b that selectively mesh with and drive the driven gear 323. A shift-operating lever (not shown) affixed to a supporting socket 80 on the top of the motor case 62 permits a user of the toy to pivot the motor case between the three positions established by the detent, to wit: (1) a forward position (FIG. 6) in which the output teeth 322b of the pinion 322 engage and drive the axle gear 323; (2) a neutral position (FIG. 7) in which the axle gear 323 is disengaged from both sets of teeth 322b and 324b of the idler pinions 322 and 324; and (3) a rearward drive position (FIG. 8) in which the output teeth 324b of the pinion 324 engage and drive the axle gear 323. To accommodate different rotational positions of the rear axle 22 and the axle gear 323 at the time of engagement of either of the pinions 322 or 324 with it, the axle gear 323 is rotatable through a fractional revolution relative to the axle 22 and is coupled to the axle by a clutch disc 82 that is affixed to the axle and with which the gear 323 is held engaged by a spring 86.

Figure 5:
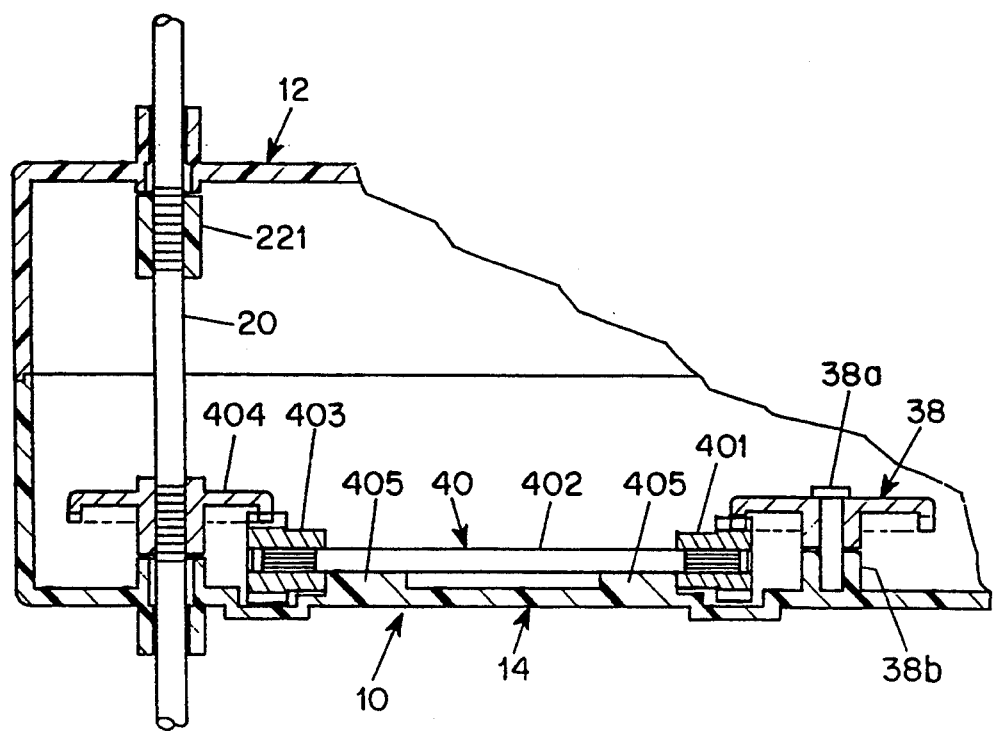
FIG. 5 is a fragmentary cross-sectional view, taken along the lines 5-5 of FIG. 2.

The first transmission train 36 of the coupling transmission 34 by which rotation of the motor-driven rear axle 22 is transmitted to the front axle 20 comprises a crown gear 361 affixed to the rear axle, a driven pinion 362 affixed to one end of a drive shaft 363 and meshing with the crown gear 361, and a driving pinion 364 affixed to the shaft 363 and meshing with the idler 38, which is a crown gear and is rotatably carried on a pin 38a affixed to a boss 38b on the case part 14 (see FIGS. 2 and 5). The second transmission train 40 of the coupling transmission 34 comprises a driven pinion 401 affixed to one end of a drive shaft 402 and meshing with the idler crown gear 38, a driving pinion 403 affixed to the shaft 402, and a crown gear 404 affixed to the front axle (see FIGS. 2 and 5). The drive shafts 363 and 402 of the coupling transmission 34 intersect at an angle of substantially less than 180 degrees, the idler 38 being located a substantial distance from the base plane of the chassis defined by the axles 20 and 22. The idler is located intermediate of planes that include the ! respective axles and are perpendicular to the base plane. The angular relationship between the shafts and the elevation of the idler permit the bottom portion of the chassis housing 10 to be raised above the base plane, which better enables the vehicle to climb over obstacles and improves the appearance of the toy.

As appears clearly in FIG. 5, the drive shaft 402 is received for rotation in slots defined by bosses 405 on the case part 14, the slots defining the axial and lateral positions of the shaft except in a direction perpendicularly inwardly from the housing side wall. The idler crown gear 38 and shaft crown gear 404, each of which is affixed in a lateral position relative to the housing, hold the shaft 402 in the slots. In that regard, the axle 22 is positioned axially in the housing 10 by the crown gear 404 on one side and by a collar 221 affixed to the shaft and the other side. The same mounting and retention arrangement are provided for the shaft 363.

Figure 7:
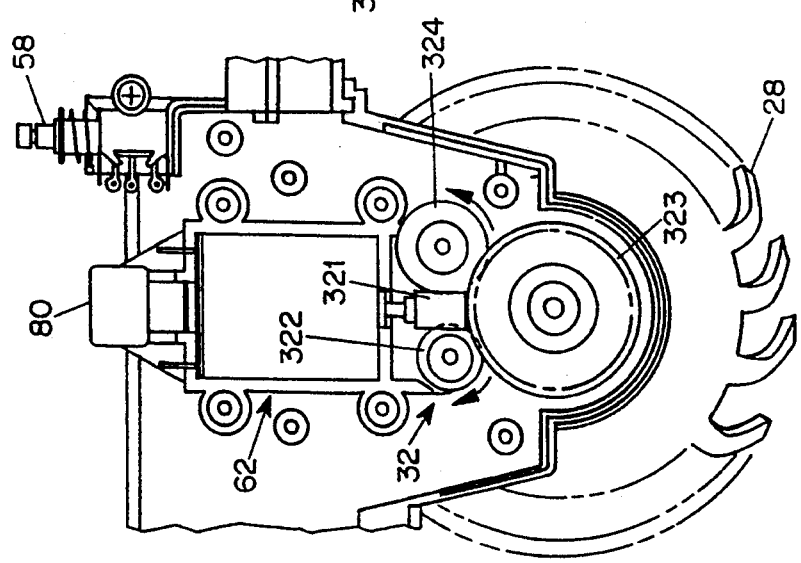

The user turns the motor on and off by pushing on the switch 58 and selects forward or reverse by pivoting the motor case using the hand lever referred to above that is connected to the top of the motor case. If a wheel (or wheels) is subjected to a resisting torque that prevents the wheels from rotating when the motor is on and forward or reverse drive is engaged, the reaction torque is transmitted from the wheels or wheels to the rear axle, and the motor will be pivoted in reverse of the driving direction of the axle, thereby disengaging the output transmission 32 from the driving connection with the motor automatically by overcoming the force of the detent 72 and pivoting the motor to the neutral position (FIG. 7). The force of the detent can be designed to release the motor case under a predetermined reverse or resisting torque applied to the wheels. The automatic transmission disengagement feature prevents undue current draw from the batteries and possible overheating of or damage to the motor due to overloading and stalling of a wheel or wheels.

I claim:

1. A chassis and drive train for toy vehicles comprising a housing, first and second axles mounted on the housing for rotation about parallel axes defining a base plane, a drive motor, an output power transmission means coupled between the motor and the first axle for driving the first axle, and coupling transmission means connected between the first and second axles for transmitting the rotation of the first axle to the second axle, the coupling transmission means including a first transmission means driven by the first axle, an idler gear mounted on the housing and driven by the first transmission means, and a second transmission means driven by the idler gear and driving the second axle, the first transmission means including an input gear on the first axle, a drive shaft having a driven gear coupled to the input gear and a driving gear coupled to the idler gear, and the second transmission means including a drive shaft, a driven gear on the drive shaft coupled to the idler gear, a driving gear on the drive shaft, and an output gear on the second axle, and the idler gear being located a substantial distance from the base plane and intermediate of planes that include the respective axles and are perpendicular to the base plane.

2. A chassis and drive train according to claim 1 wherein the drive motor and the output power transmission means form a drive unit that is pivotally mounted on the housing, and the output power transmission means includes a pair of output gears arranged to mesh selectively with a driven gear on the first axle upon pivoting of the drive unit, thereby to provide forward and reverse driving of the first axle.

3. A chassis and drive train according to claim 1 wherein the drive motor and the output power transmission means form a drive unit that is mounted on the housing to pivot about an axis parallel to the first axle, and the output power transmission means includes a pair of output gears arranged to mesh selectively with a driven gear on the first axle upon pivoting of the drive unit, thereby to provide forward and reverse driving of the first axle.

4. A chassis and drive train according to claim 1 wherein the drive motor and the output power transmission means form a drive unit that is mounted on the housing to pivot about an axis parallel to the first axle, and the output power transmission means includes an output worm gear on the motor shaft and a pair of compound output gears, each having a first circumferential row of teeth driven by the worm gear and a second circumferential row of teeth arranged to mesh selectively with a driven gear on the first axle upon pivoting of the drive unit, thereby to provide forward and reverse driving of the first axle at selected drive positions of the drive unit.

5. A chassis and drive train according to claim 4 and further comprising detent means acting between the drive unit and the housing for releasably establishing and maintaining the selected drive positions and a non-driving position of the drive unit.

6. A chassis and drive train according to claim 5 wherein the detent means is arranged to release the drive unit from the respective drive positions upon application of a predetermined reaction torque imposed between the driven gear of the first axle and the respective output gears of the output power transmission means.

7. A chassis and drive train according to claim 2 wherein the drive unit is mounted on one side of the base plane and proximate to a plane perpendicular to the base plane and including the first axle.

8. A chassis and drive train according to claim 7 wherein the drive motor is a battery-powered motor and wherein the batteries are received in a battery-holder affixed in the housing intermediate of respective planes perpendicular to the base plane and including the axles.

9. A chassis and drive train according to claim 8 wherein the battery-holder receives the batteries with their axes substantially perpendicular to the base plane.

10. A chassis and drive train according to claim 1 wherein the idler gear is a crown gear, the input gear on the first axle and the output gear on the second axle are crown gears, and the driven and driving gears on the axles of the first and second transmission means are pinions.

* * * * *